United States Patent
Desai et al.

(10) Patent No.: US 10,956,913 B2
(45) Date of Patent: *Mar. 23, 2021

(54) MESSAGE HANDLING AT A MOBILE GATEWAY FOR MANAGING DATA STRUCTURES AND SUB-STRUCTURES

(71) Applicant: First Data Corporation, Greenwood Village, CO (US)

(72) Inventors: Jigar Desai, Marietta, GA (US); Francis Pavlik, Sandy Springs, GA (US); Scott Sanchez, Atlanta, GA (US); Scott Francis, Decatur, GA (US); Deneen Luxford, Scottsdale, AZ (US); Eva Russo, Atlanta, GA (US); Phillip Wiggins, Atlanta, GA (US); Matthew Borenstein, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/412,032

(22) Filed: May 14, 2019

(65) Prior Publication Data

US 2019/0333065 A1    Oct. 31, 2019

Related U.S. Application Data

(63) Continuation of application No. 14/859,149, filed on Sep. 18, 2015, now Pat. No. 10,332,119.
(Continued)

(51) Int. Cl.
*G06Q 20/40* (2012.01)
*G06Q 20/32* (2012.01)
*G06Q 40/02* (2012.01)

(52) U.S. Cl.
CPC ....... *G06Q 20/405* (2013.01); *G06Q 20/3223* (2013.01); *G06Q 40/02* (2013.01)

(58) Field of Classification Search
CPC ...... G06Q 20/36; G06Q 20/322; G06Q 40/02; G06Q 20/405; G06Q 20/3223;
(Continued)

(56) References Cited

U.S. PATENT DOCUMENTS 7,676,432 B2    3/2010 Ling
7,720,755 B1    5/2010 Coyle
(Continued)

OTHER PUBLICATIONS

Rose, Margaret. "data structure." SearchSQLServer.com. <https://searchsqlserver.techtarget.com/definition/data-structure>. Feb. 28, 2006. (Retrieved Sep. 6, 2018). (Year: 2006).

*Primary Examiner* — Elda G Milef
(74) *Attorney, Agent, or Firm* — Kilpatrick Townsend & Stockton LLP (57) ABSTRACT

Users of mobile devices communicate through a mobile gateway to a transaction processing system. The transaction processing system manages accounts, such as debit card accounts, for the users. The accounts include a main account for each user and sub accounts that are linked or related to the main account. Funds may be transferred between a main account and its linked sub accounts, including automatic funds transfer when a transaction (e.g., a payroll deposit from an employer or a debit transaction at a specified retailer) is made against the main account and meets certain parameters established by a user. Access to linked sub accounts is made through use of internal account IDs, rather than the account number of the main account.

21 Claims, 8 Drawing Sheets

Related U.S. Application Data

(60) Provisional application No. 62/052,327, filed on Sep. 18, 2014.

(58) Field of Classification Search
CPC ...... G06Q 40/12; G06Q 20/227; G06Q 20/00; G06Q 20/12; G06Q 20/3221; G06Q 20/3224; G06Q 20/3255; G06Q 20/065; G06Q 20/0655; G06Q 20/0658; G06Q 20/085; G06Q 20/0855; G06Q 20/145; G06Q 20/20; G06Q 20/3226; G06Q 20/325; G06Q 20/351; G06Q 20/3676; G06Q 20/305; G06Q 20/32; G06Q 20/3227; G06Q 20/38; G06Q 30/0222; G06Q 30/0268; G06Q 30/0601; G06Q 40/04; G06Q 20/10; G06Q 20/108; G06Q 20/326; G06Q 20/06; G06Q 30/00; G06Q 30/06; G06Q 20/04; G06Q 20/08; G06Q 20/3572; G06Q 30/0253

See application file for complete search history.

(56) References Cited

U.S. PATENT DOCUMENTS

| | | |
|---|---|---|
| 7,860,784 B2 | 12/2010 | Bedier |
| 2010/0146607 A1 | 6/2010 | Piepenbrink |
| 2012/0330837 A1 | 12/2012 | Persaud |
| 2014/0188737 A1 | 7/2014 | Salah |

MESSAGE HANDLING AT A MOBILE GATEWAY FOR MANAGING DATA STRUCTURES AND SUB-STRUCTURES

CROSS-REFERENCES TO RELATED APPLICATIONS

This application is a continuation of U.S. patent application Ser. No. 14/859,149, entitled "Message Handling At A Mobile Gateway For Managing Data Structures And Sub-Structures," filed Sep. 18, 2015, which claims the benefit of and is a nonprovisional of U.S. Provisional Patent Application No. 62/052,327, entitled "Message Handling At A Mobile Gateway For Managing Data Structures And Sub-Structures," filed Sep. 18, 2014, which is incorporated by reference in its entirety for all purposes.

BACKGROUND OF THE INVENTION

The use of mobile devices to conduct financial transactions is becoming increasingly common. Consumers are able to cash checks, view account balances, transfer funds and pay bills. The ease of conducting real-time transactions at mobile devices can have unintended consequences. For example, a consumer may conduct a transaction or transfer funds based on currently viewed balances, without appreciating that other transactions (such as automatic payments from an account) will be posted later in the day and may impact balances available for consumer initiated transactions. At the same time, for many consumers, the ability to automatically transfer unneeded funds from a primary account into a secondary account (such as a "rainy day" fund or account) in response to deposits or other transactions at the primary account, offer an attractive and easy way to save money There has thus arisen the need to keep the user interface at a mobile device simple, yet also limit the possible downsides of a consumer conducting too many or ill-timed transactions, especially from a primary account where money is being separately transferred (e.g., periodically) to a secondary account used for savings. There has further arisen the need to "protect" the funds in the secondary account by making them less visible to the consumer who might otherwise prematurely access and deplete the saved funds before they serve their intended purpose.

BRIEF SUMMARY OF THE INVENTION

There is provided, in accordance with embodiments of the present invention, a network/system and method for a mobile user to request automatic transfer of funds from a main account to a linked sub account, where upon posting of a transaction at the main account having a predetermined amount and transaction type, the automatic funds transfer is posted immediately from the main account to the sub account.

In one embodiment, a method includes creating, at a memory device in a transaction processing system, multiple data structures associated with the mobile device user, the data structures including a first data structure representing a main account of a consumer and a second data structure representing a sub account of a consumer; and, at processor in the transaction processing system, managing an automatic funds transfer transaction from the main account to the sub account. The processor manages automatic funds transfers by receiving, from a mobile device associated with the consumer, a request to automatically transfer funds from the main account to the sub account, after a specified triggering transaction has been posted to the main account; determining, from the request, a predetermined transaction type associated with the specified deposit transaction; upon posting of a deposit transaction at the main account having the predetermined transaction type, immediately posting the automatic funds transfer transaction from the main account to the sub account, rather than at the end of a day; and sending notification to the consumer that the automatic funds transfer from the main account to the sub account has occurred.

A more complete understanding of the present invention may be derived by referring to the detailed description of the invention and to the claims, when considered in connection with the Figures.

DETAILED DESCRIPTION OF THE INVENTION

Figure 1:
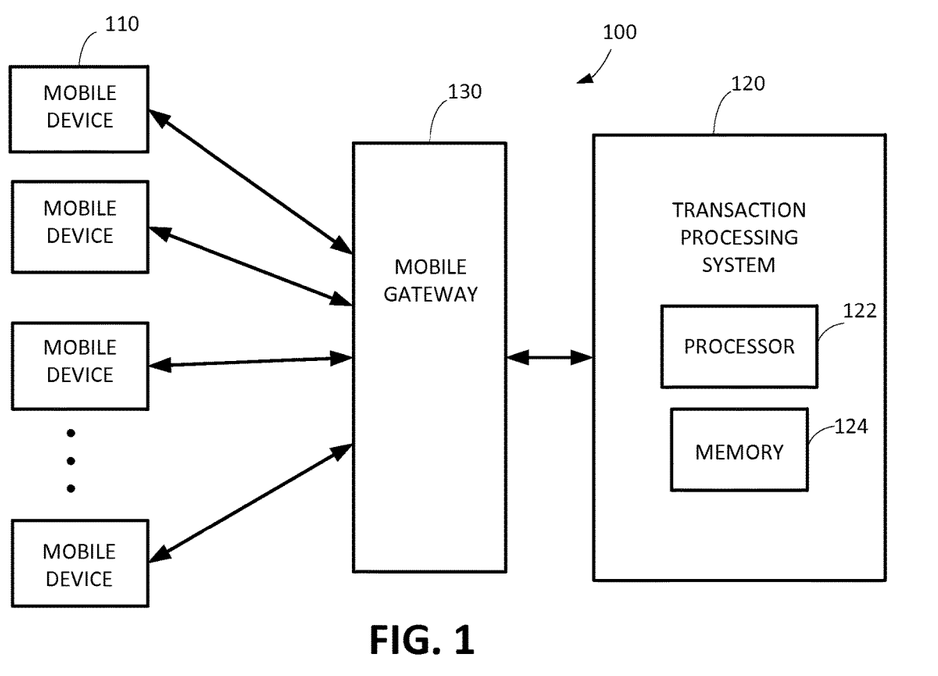
FIG. 1 is a general block diagram showing a network in which a plurality of mobile devices communicate through a mobile gateway to a transaction processing system.

There are various embodiments and configurations for implementing the present invention. One such implementation is shown in FIG. 1, where according to embodiments of the invention, a network 100 is illustrated for permitting users at mobile devices 110 to conduct and manage transactions at a transaction processing system 120 via communications through a mobile gateway 130. Various kinds of transactions may be conducted using the network 100. In one embodiment, transactions involve the use of debit card accounts maintained at the transaction processing system 120, with users managing those accounts at the mobile devices 110. The users may, as examples, initiate payment transactions (e.g., debiting an account for a payment being transferred to a merchant by the system 120), make deposits (e.g. using a captured check image to deposit proceeds from the check into an account) and transfer money from one account to another (e.g., transferring funds from one account of a user to another account of a user).

As will be described shortly in greater detail, accounts maintained at the transaction processing system 120 for an account holder (a user at one of the mobile devices 110) may include a main account for the user, and one or more sub accounts for the same user. Sub accounts may be used for purposes of segregating funds for various purposes, such as saving money through a process akin to "piggy bank" or "cookie jar," to be used for leisure or vacation, to be used as a "rainy day" account, or to build a savings fund for some other general or specified purpose. In one described embodiment, the account holder may designate funds to be periodically transferred from the main account to any one or more of the sub accounts, e.g., when a deposit (such as a payroll deposit) is received at the main account. In other described embodiments, the account holder may designate funds to be transferred from the main account to the sub accounts whenever a specified debit transaction is conducted against the main account, such as when a user wants to discourage such a transaction (e.g., a transfer is made when the account holder makes a purchase at a specific retailer for an expense seen as unnecessary or undesirable by the account holder, and thereby reducing the balance available to the account holder in the main account for other purposes). In yet another described embodiment, the account holder may designate funds to be transferred from the main account to the sub accounts whenever a specified debit transaction is not conducted against the main account (e.g., on a daily basis and as a "reward," when the account holder wants to provide an incentive to himself/herself for not conducting a transaction on that day at a specific retailer which the account holder wants to discourage). In some aspects of the invention, the main account and sub accounts are set up to be less visible to the account holder by using internal account IDs, and thus make the sub account less viewable/accessible at a mobile device when using of the account number associated with the main account.

For purposes of managing data structures that implement accounts, the transaction processing system 120 includes a processor 122 and an associated memory system 124. The memory system 124 holds data pertaining to each account, including an account number and a separate internal account ID, a ledger (showing various transactions against an account), account balance, and other data used to manage the account, all to be described shortly.

Figure 2:
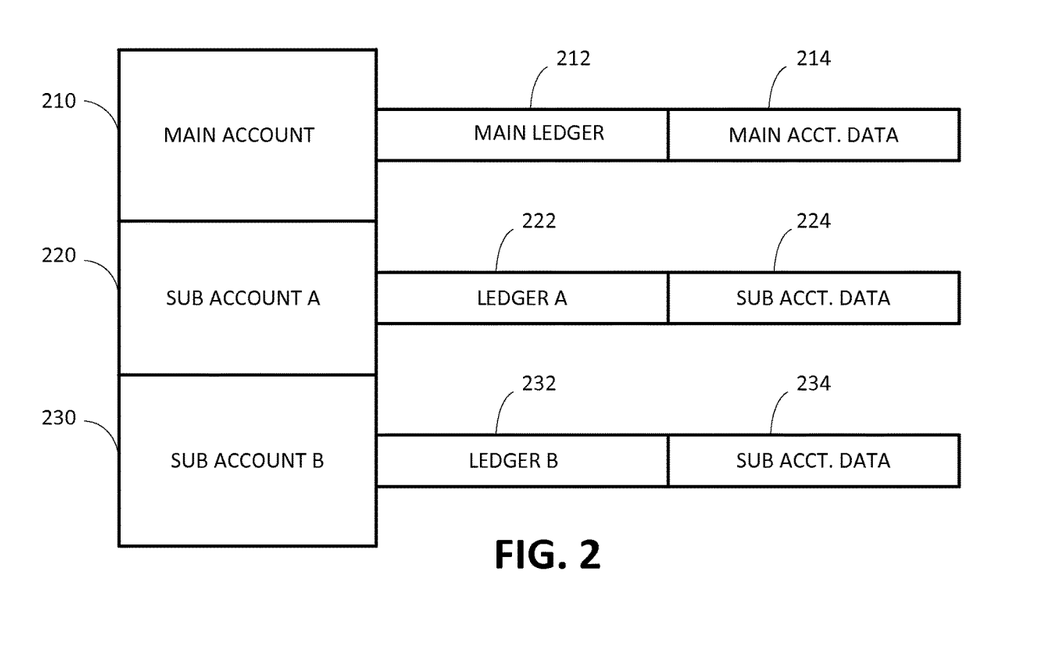
FIG. 2 illustrates the overall data structures associated with a main account and linked sub accounts, which are maintained at the transaction processing system of FIG. 1.

FIG. 2 illustrates the data structures maintained within memory system 124 of the transaction processing system 120 for one main account 210 and its related or linked sub accounts 220 and 230 (sub account A and sub account B). The data structure for each account and sub account generally includes ledgers 212, 222 and 232 (showing an account balance and all the transactions, both credits and debits posted to the corresponding account), and account managing data 214, 224 and 234. The following tables illustrate representative ledger and managing data maintained in the data structures for a main account (Table I) and its related sub accounts (Table II):

TABLE I

| Main Account | |
|---|---|
| Account Number* | An identifying account number (e.g., a primary account number or PAN) used by an account holder and linked to an account card/device, such as a debit card or a mobile device used to access the account |

TABLE I-continued

| Main Account | |
|---|---|
| Account ID* | A separate internal account identifier that would not be provided to the account holder |
| Linked Sub Accounts* | Sub Accounts linked to the main account (identified by internal sub account IDs) |
| Account Type* | Type of account (debit/checking, savings, stored value card, etc.) |
| Account Status* | Status of the account, such as open, closed, inactive, etc. |
| Open Date* | The date the account was opened |
| Close Date* | If closed, the date the account was closed |
| Account Holder* | The name of the account holder |
| Account Holder ID* | A personal identifier (e.g., SSN) |
| Ledger Balance** | The current balance maintained in the account |
| Transaction Data** | For each transaction posted to the account, various data items such as a transaction ID, a transaction type, a description of the transaction, a posting date, and a transaction amount |
| Statement Data** | For each statement (e.g. monthly) that has been issued for the account, various items such as a statement ID, a statement date, a statement closing date, a statement balance, a previous statement balance, each of the credits posted during the statement period, each of the debits during a statement period, a total credit count, and a total debit count |

*Account Managing Data
**Ledger Data

TABLE II

| Sub Account | |
|---|---|
| Sub Account ID* | An internal account identifier that would not be provided to the account holder or account card/device, and that is linked to the main account only through the internal account ID of the main account |
| Parent Account ID* | The internal account identifier of the linked parent (main) account |
| Sub Account Name* | The name given to the sub account by the account holder (e.g. "Vacation Savings," "New Car Fund") |
| Sub Account Type* | The type of account (debit/checking, savings, stored value card, etc.) |
| Sub Account Status* | Status of the account, e.g., enabled, disabled, closed |
| Open Date* | The date the sub account was opened |
| Closed Date* | If closed, the date the sub account was closed |
| Auto Funded In Amount* | When an automatic funds transfer has been enabled, the amount to be transferred into the sub account |
| Sub Account Priority Order* | When amounts are transferred out to manage a shortage of funds in the main account, the priority of this sub account in relation to other sub accounts |
| Open Date* | The date the sub account was opened |
| Close Date* | The date the sub account was closed |
| Notification Data* | Data items that identify the types of alerts/notifications sent to the account holder for certain transactions, and the name and email address/phone number of the person to be notified |
| Ledger Balance** | The current balance maintained in the sub account |
| Transaction Data** | Same data items as transaction data for main account above, but only for transactions posted to the sub account |
| Statement Data** | Same data items as statement data for main account above, but only for activity related to sub account |

*Account Managing Data
**Ledger Data

Figure 3:
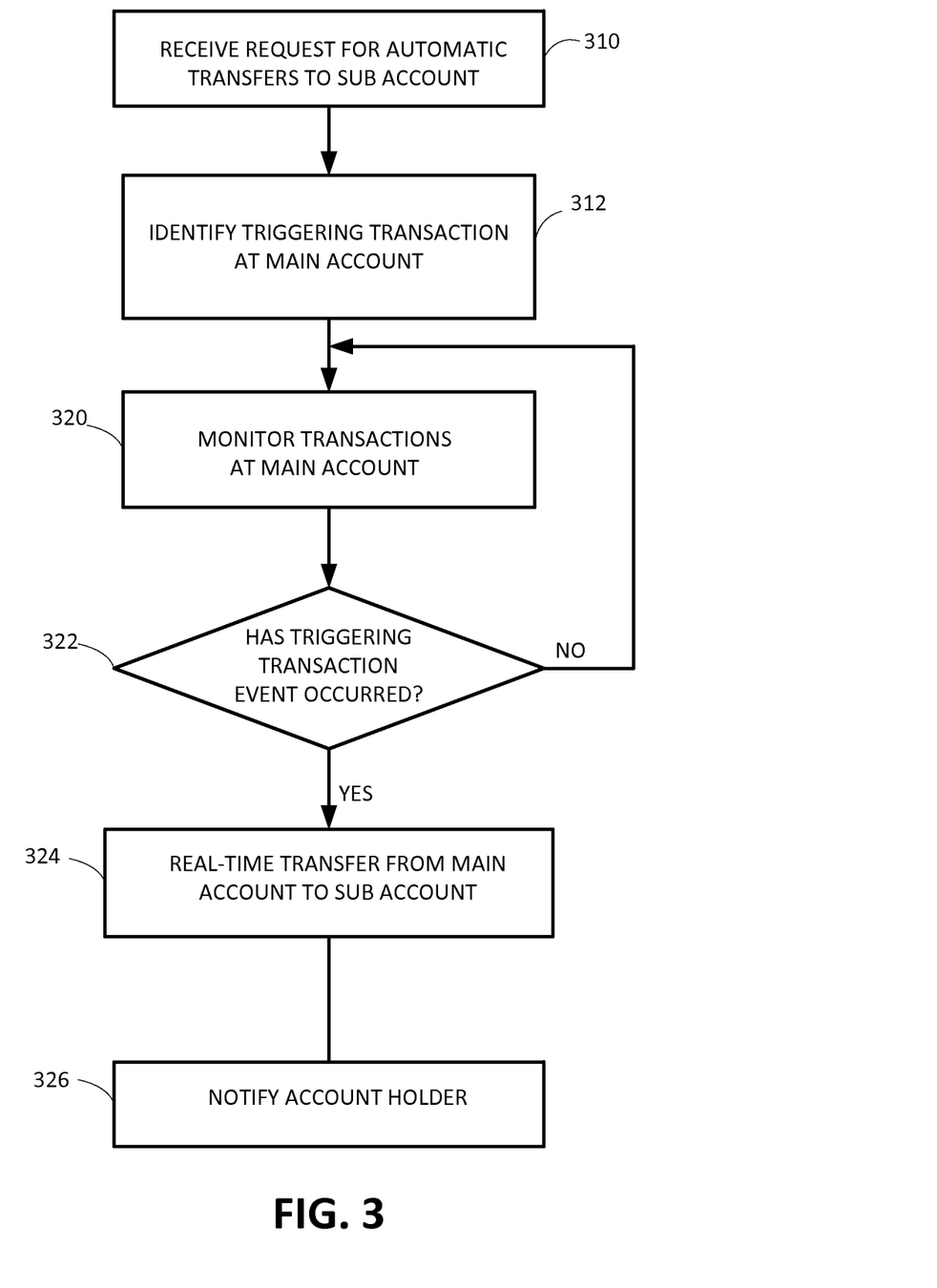
FIG. 3 is a flow diagram illustrating a general process for managing automatic transfers of funds from a main account to a sub account.

FIG. 3 illustrates a general process for managing automatic transfers of funds from a main account to a sub account. At step 310, the system 120 receives a request from a user via the mobile gateway 130 to set up automatic transfers from that user's main account to one or more of the user's sub accounts. The request is created with data entered at the user's mobile device and includes data identifying a transaction to the main account that will trigger a transfer of funds. In an embodiment where the transfer is desired to be triggered as a result of a deposit (such as a payroll deposit), it is the deposit transaction itself (rather than an account balance in the main account) that is used to trigger the transfer. As mentioned earlier, many transactions (such as debit transactions and scheduled ACH fund transfers out) are posted to an account at the end of the business day. To prevent an account holder from inadvertently conducting debit transactions at the main account that do not leave sufficient funds for a scheduled funds transfer or a debit transaction, in one embodiment an automatic funds transfer from the main account to the sub account will occur at the same time as the deposit that triggers the transfer (such as a periodic paycheck deposited as an ACH credit) or at the same time as a debit transaction that triggers the transfer (such as an undesirable purchase transaction at a specified retailer/merchant). Thus, an account holder will see the balance resulting from the automatic transfer immediately after the transfer, and will be less likely to spend money (such as by withdrawals or debit card transactions) at the main account that might otherwise leave insufficient money or result in a lower than expected balance at the end of the day.

In order to identify transactions that will trigger an automatic funds transfer, the request at step 310 includes a specific transaction type for the transaction, which is identified by the system 120 at step 312. In one embodiment to be described in greater detail later in conjunction with FIGS. 4 and 5, a deposit transaction may be the triggering transaction. In such case, a specific transaction type associated with a credit/deposit will be used by the system 120 in order to immediately (or almost immediately, say, within approximately 5-10 minutes), initiate a funds transfer from the main account to the sub account. In many cases, a paycheck amount that is periodically deposited into the account will be known to the user, and so that paycheck amount may also be provided by the user at step 312. The automatic funds transfer represents an amount that the user wants to allocate from the paycheck and keep separate from the main account, e.g., as a savings fund in a sub account. However, in other cases, deposits that trigger funds transfer may not be as predictable, and the user may specify a range or a minimum threshold for the deposit amount (say, any deposit into the main account over $1000) that will trigger the funds transfer.

In another embodiment to be described in greater detail later in conjunction with FIGS. 6 and 7, a debit transaction may be the triggering transaction. While the account holder may specify any one of many different kinds of debit transactions to trigger the automatic funds transfer, in a specific implementation the triggering transaction would be one at a specific retailer, such as a specified coffee shop with high-priced coffee products. As an example, any time the account holder visits and conducts the transaction at the coffee shop (which, presumably, would be a discretionary purchase and not a normal living expense), a small funds transfer (say, $3) could be made to the sub account, which would operate as a disincentive to the account holder to visit the coffee shop since less money would be available for spending in the main account. As yet another example, for an account holder that visits the same coffee shop frequently (e.g., daily), any day where the transaction processing system 120 determines that there has been no purchase at the coffee shop, a small funds transfer could be made to the sub account (say, an account that has been earmarked for vacation funds) as a reward for not spending money on an unnecessary expense. The account holder may chose (at step 310) whether the trigger for a transfer of funds will be a specified debit transaction occurring or will be the absence of a specified debit transaction, based on, for example, which of the triggers is more likely to lead to less undesirable spending or to more savings.

Other parameters for identifying the triggering transaction are possible, and will be described later.

Transactions at the main account are monitored at step 320 and if the system determines a transaction event (or the absence of a transaction event) for which a funds transfer is to be triggered, step 322, then a real-time or immediate transfer of funds from the main account to the sub account occurs at step 324. If any transaction does not meet the pre-established transaction parameters for a transfer at step 322, then the system continues to monitor transactions at step 320. When a transfer of funds has occurred at step 324, the system 120 may ntoify the user of the transfer at step 326.

In embodiments of the invention, transaction type identifiers that accompany transaction authorization messages received at the transaction processing system 120 for a specified account can advantageously be used (at least in part) to determine a triggering event, and in some cases initiate a review of specific fields of a deposit transaction message for various other parameters used to determine a triggering event. The following Table III illustrates various transaction type identifiers that accompany transaction data received at the transaction processing system 120:

TABLE III

| Transaction Type ID | Transaction Name |
| --- | --- |
| 101 | Load funds |
| 135 | ACH Deposit |
| 137 | Retail Web Deposit (by customer) |
| 362 | Card to Card Fund Transfer |
| 434 | Transfer From Secondary Card Funds |
| 447 | POS Card Load (e.g., at authorized retailer point-of-sale) |
| 451 | POS Card Reload (e.g., at authorized retailer point-of-sale) |
| 482 | Deposit To Card |
| 521 | Debit Transaction (e.g., at retailer) |

The above transaction types are exemplary and many more transaction types might exist depending on the functionality that is desired for a specific card (and its account) and access to the funds associated with it. In this exemplary set of transaction types, it should be noted that transaction types 101-482 are credit or deposit transactions, and the remaining transaction type 521 is a debit transaction. Further, the transaction type identifiers would precede more detailed transaction information (e.g., in a transaction authorization message, as will be described in greater detail later).

Figure 4:
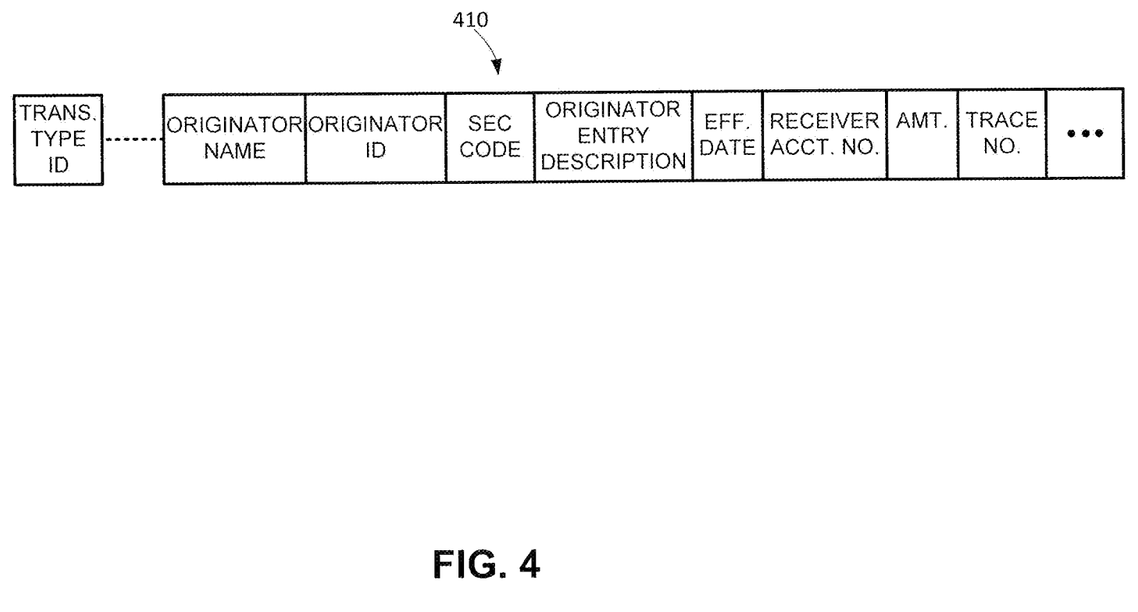
FIG. 4 is a simplified illustration of an ACH message sent for purposes of depositing money in an account, such as the main account illustrated in FIG. 2.
Figure 5:
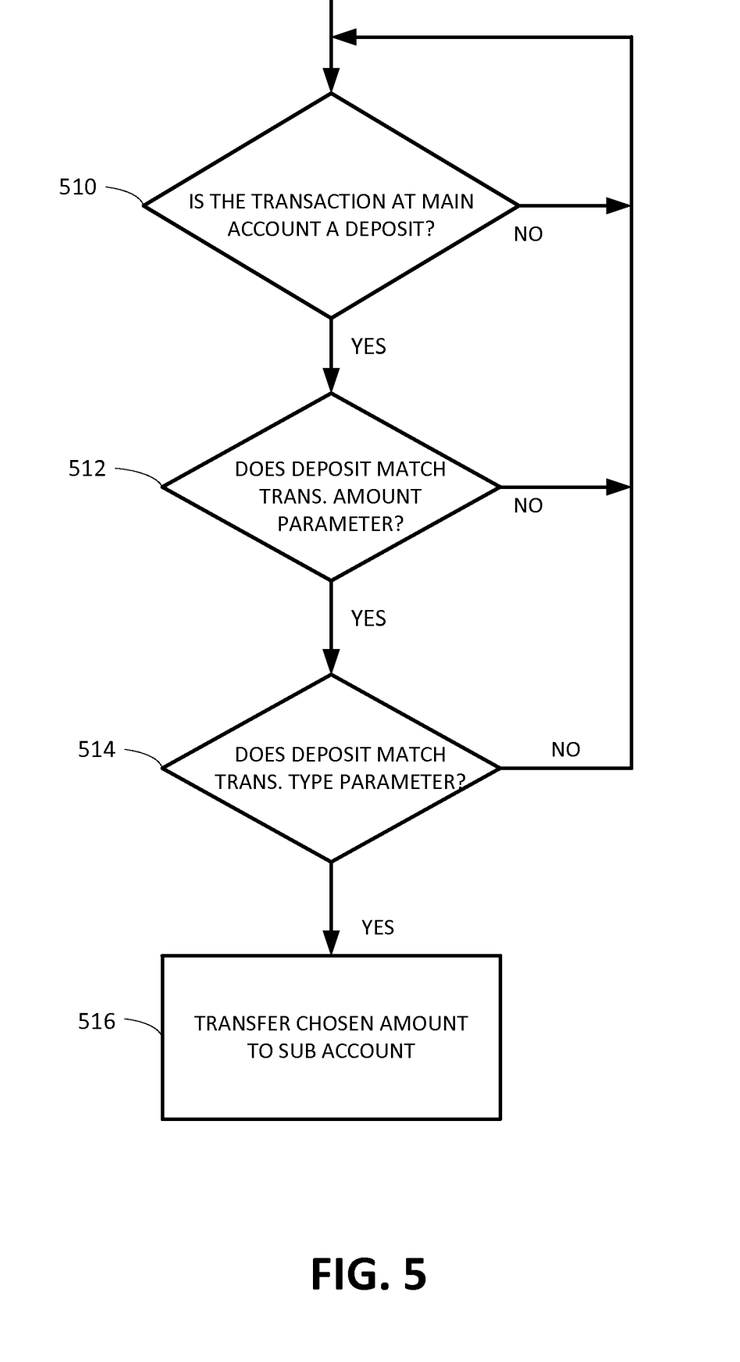
FIG. 5 is a flow diagram illustrating a process for initiating an automatic transfer of funds from a main account to a sub account, in response to a triggering ACH deposit to the main account.

FIGS. 4 and 5 illustrate in greater detail one embodiment of the invention in which a deposit (such as a payroll deposit) is made to a main account and results in an automatic funds transfer. Transaction codes (such as those shown in Table III) accompanying transaction messages will indicate whether a transaction is a credit or deposit.

For deposit transactions having a transaction type that will give rise to an automatic funds transfer, the request for an automatic transfer to a sub account at step 310 could include, as an example, transaction type 135 (ACH Deposit) from the above TABLE II, which is typically the transaction type used when an ACH payroll amount is deposited into an account. In some cases, the transaction type may not be specified by the user, but rather may be programmed within system 120 by its operator, based on transactions likely being deposits of a type for which transfer for a money to savings is often requested or deemed desirable.

A typical transaction authorization message may have other fields useful as well in determining whether a deposit/credit to an account may in fact be a payroll deposit, from which an account holder may want an automatic funds transfer from the main account 210 to one of the sub accounts 220 and 230.

FIG. 4 illustrates some of the fields present in a typical ACH transaction authorization entry/message 410 (i.e., following a transaction type ID 135 shown in Table III identifying an ACH deposit) that could be used by the transaction processing system 120 to determine that a certain type of deposit has been made to the main account 210 and to trigger a transfer of funds to one of the sub accounts 220 and 230. The fields shown in FIG. 4 are only exemplary, and there may be other fields in an ACH transaction message that are used for various purposes by the transaction processing system 120. The various field elements illustrated (as well as others that are not illustrated in FIG. 4) are governed by the National Automated Clearing House Association rules on ACH formats, described (among other places) at www.ach-rulesonline.org In connection with the exemplary message format seen in FIG. 4, the message would be sent from an originator's bank (i.e., the bank of an employer making a payroll deposit) to a receiver's bank (e.g., the bank where money is being deposited). As seen, the entry may include the name of the originator (in the case of a deposit, the payor), a unique ID associated with the originator, a standard entry class (SEC) code (identifying one of various general classes of ACH transactions that can be processed between banks), an originator entry description (typically, a few words of text chosen by the originator and describing the transaction), an effective date, a transaction code (e.g., identifying the transaction as a debit or credit), the account number of the receiver/payee, the transaction amount, and a unique trace number for the transaction. Various embodiments of the present invention may use one or more of the fields (in addition to the transaction type ID preceding the ACH message) to determine whether an ACH deposit transaction should trigger an automatic funds transfer. For example, the name of the payor can be useful by comparing it to a list of likely employers. Also, among possible standard SEC codes is "PPD," which designates a "Prearranged Payment and Deposit Entry." Such a code is typically used for a recurring entry for a direct deposit of payroll (or recurring payments out of the account for bills), and can thus be used for identifying a recurring transaction. The "Originator Entry Description" is text entered by the originator, and it is common for employers to use certain key words such as "payroll" in such text when the transaction is an electronic deposit of a paycheck. The "AMT" field (the amount of the transaction) can be used to determine whether the amount meets the transaction amount parameter established by the account holder (step 312, FIG. 3). Thus, a review of these fields (individually or together) for a specific transaction by the transaction processing system 120 will indicate whether a specific ACH transaction is a triggering transaction.

FIG. 5 illustrates a more specific process for initiating a funds transfer in response to a triggering deposit transaction, with such process generally occurring within step 322 in FIG. 3. At step 510 the system 120 evaluates each transaction received at the main account to determine if the transaction is a deposit/credit, e.g., as would be indicated by the transaction type ID. If the transaction is a deposit, then at step 512 the system determines the amount of the deposit and whether that amount matches the amount parameter if established by the user when initially requesting the automatic funds transfer (step 512). If the amount of the deposit does match at step 512, the system next determines at step 514 whether the transaction matches the other transaction parameters that may have been established by the user (e.g., one more of employer name, SEC code, words used in the Originator Entry Description, etc). If there are matches at both steps 512 and 514, then the system determines that the automatic transfer is to take place at step 516. If either the deposit amount or the other transaction parameters do not match at steps 512 and 514, then the process returns to step 510 for evaluating subsequently received transactions for a triggering deposit. In should be appreciated that the order illustrated for steps 512 and 514 are exemplary, and that the order could be different (e.g., reversed).

Figure 6:
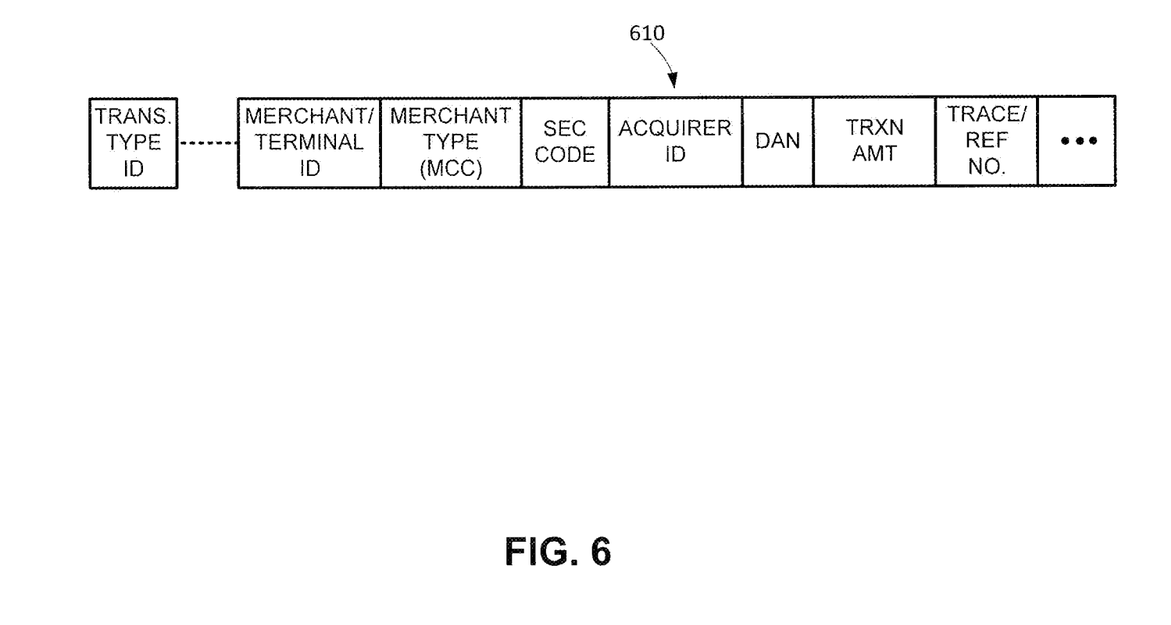
FIG. 6 is a simplified illustration of a transaction message sent for purposes of conducting a debit transaction against an account, such as the main account illustrated in FIG. 2.
Figure 7:
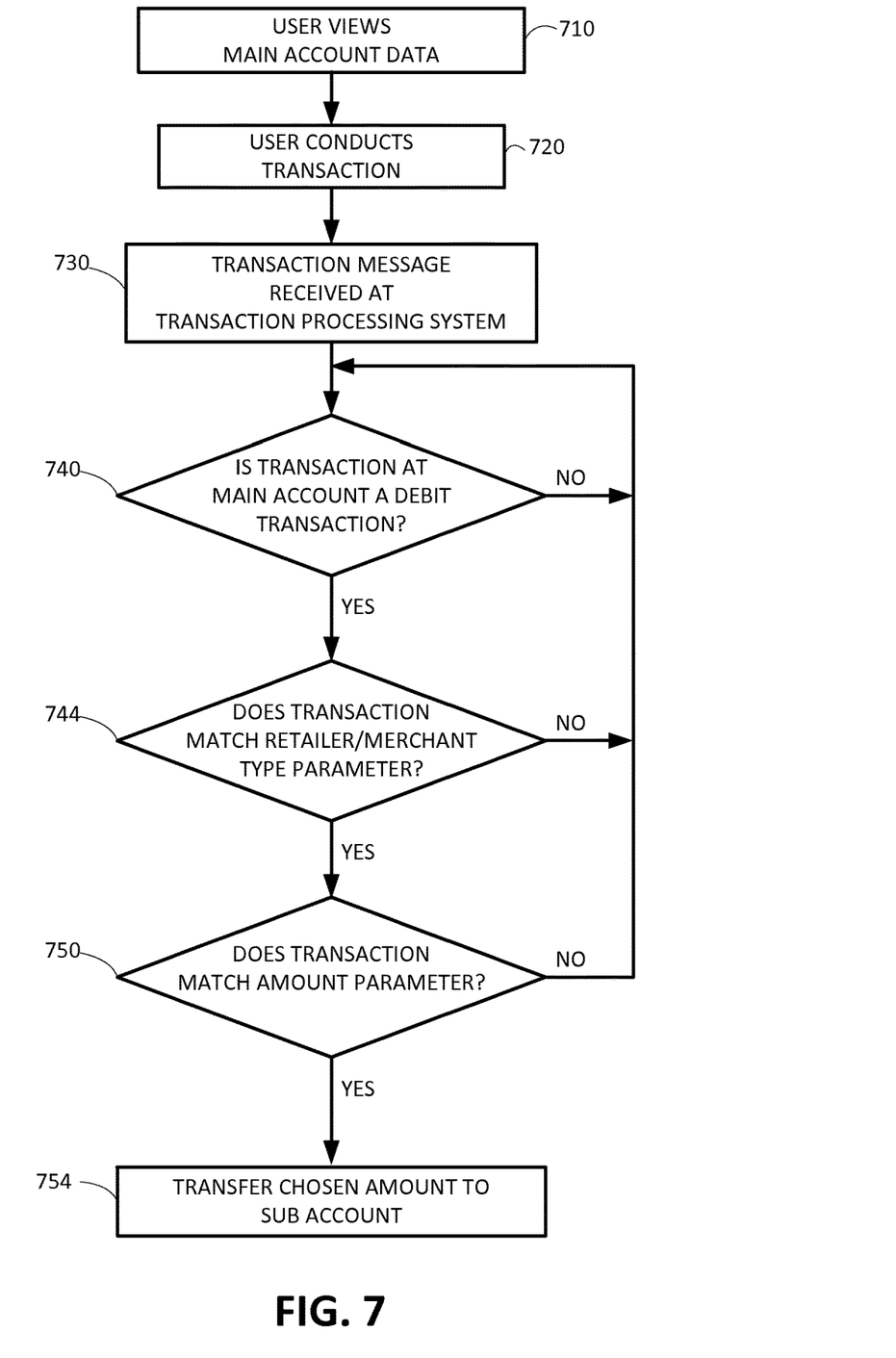
FIG. 7 is a flow diagram illustrating a process for initiating an automatic transfer of funds from a main account to a sub account, in response to a triggering debit transaction at the main account.

FIGS. 6 and 7 illustrate greater detail another embodiment of the invention in which a debit transaction (such as a transaction at a specified retailer) results in an automatic funds transfer. As an example, a transaction type ID 521 (Debit Transaction, Table II above), which is typically the transaction type used when a retail transaction is being made against an account, can be used to initiate a review of specific fields of a debit transaction authorization message to determine if a triggering transaction has occurred.

FIG. 6 illustrates some of the fields present in a typical debit transaction authorization message (i.e., following a transaction type ID 521 that identifies a debit transaction) that can be used by the transaction processing system 122 determine that a transaction has been made to the main account 210 and to trigger a transfer of funds to one of the sub accounts 220 and 230. The fields shown in FIG. 6 are only exemplary, and there are likely to be other fields in an debit transaction message that are used for various purposes by the transaction processing system 120. The various field elements illustrated (including others that are not illustrated in FIG. 6) are governed by standards set forth, for example, in ISO 8583 ("Financial Transaction Card Originated Messages-Interchange Message Specifications), established by the International Organization for Standardization.

The exemplary message 610 seen in FIG. 6 includes a merchant/terminal ID that identifies the merchant or merchant terminal at which the transaction is being conducted, a merchant type (MCC) that identifies a category for the merchant, an acquirer ID for the acquiring entity that processes the transaction (e.g., on behalf of a merchant), the primary account number or PAN for the main account (which may include a routing number for routing the transaction to the institution where the account is maintained), and a trace or reference number used for identifying the transaction as it is being processed through the network. As should be appreciated, the merchant/terminal ID may be used to identify whether a transaction is being conducted at a specific retailer (such as a retailer for which the user would like to trigger an automatic transfer of funds). Alternatively, the user could specify a category of the merchant (rather than a specific merchant) based on the MCC that would trigger a transaction. Further, the user might also specify an amount of the transaction to be used in conjunction with other parameters for triggering a funds transfer (e.g., when the user wants a transaction at a specific retailer to trigger the transfer, but only when the amount of the transaction is above or belo) a specified amount). These various parameters for establishing whether a debit transaction triggers an automatic transfer of funds would have been established by the user at step 312 (FIG. 3).

FIG. 7 illustrates a more specific process for initiating a funds transfer in response to a triggering debit transaction, with such process generally occurring within step 322 in FIG. 3. At step 710, the account holder/user would typically view (at a mobile device 110) the main account data prior to conducting a transaction, e.g., to confirm the proper account is being used and there is sufficient money in the account to conduct the transaction. The user then conducts the debit transaction (step 720), for example, using the mobile device to communicate with a retailer point-of-sale (POS) terminal. A transaction authorization message (such as illustrated in simplified form in FIG. 6) is generated by the retailer/merchant and received at the transaction processing system 120, step 730. At step 740, the system 120 evaluates each transaction conducted against the main account to determine if the transaction is a debit transaction, e.g. as would be indicated by the transaction type ID 521 (Table III). At step 744, the system determines whether the transaction matches a merchant (merchant/terminal ID) or a merchant type (MCC) that has been established by the user as one of the triggering parameters. If there is a match of the merchant or merchant type, then the system determines whether the transaction amount matches an amount parameter (step 750), if one has been established by the user. If there is a match at steps 744 and 750, then a transfer is made from the main account to the sub account (step 754), with the amount of the transfer having been earlier chosen or established by the user (step 312). If the transaction is not a debit transaction at step 740 or if the retailer or the transaction amount do not match at steps 744 and 750, then the process returns for evaluating subsequently received transactions at step 740.

As mentioned earlier, while the main account 210 and the sub accounts 220 and 230 are linked, access to the sub accounts from the main account is accomplished by use of internal account IDs (separate from and rather than the account number of the main account). As referenced in Tables I and II above, internal account IDs are associated with each of the main account and the link subaccounts. Access to the subaccounts from the main account is accomplished by using the internal account ID of the sub account rather than the account number of the main account. Further, in the data (seen in Tables I and II above) stored in the memory system 124 (at system 120), the internal account ID of the sub account is linked to the main account only through the internal account ID of the main account, rather than through the account number (e.g. PAN) of the main account. Thus, when a user views account data relating to the main account (e.g., step 710 of FIG. 7, prior to conducting a debit transaction), the account number for the main account only provides data (such as account balance data) pertaining to the main account and not the sub account. Thus, the sub account balances are segregated from the main account and will not be seen and relied upon by the account holder when looking at an account balance in advance of conducting a transaction.

Figure 8:
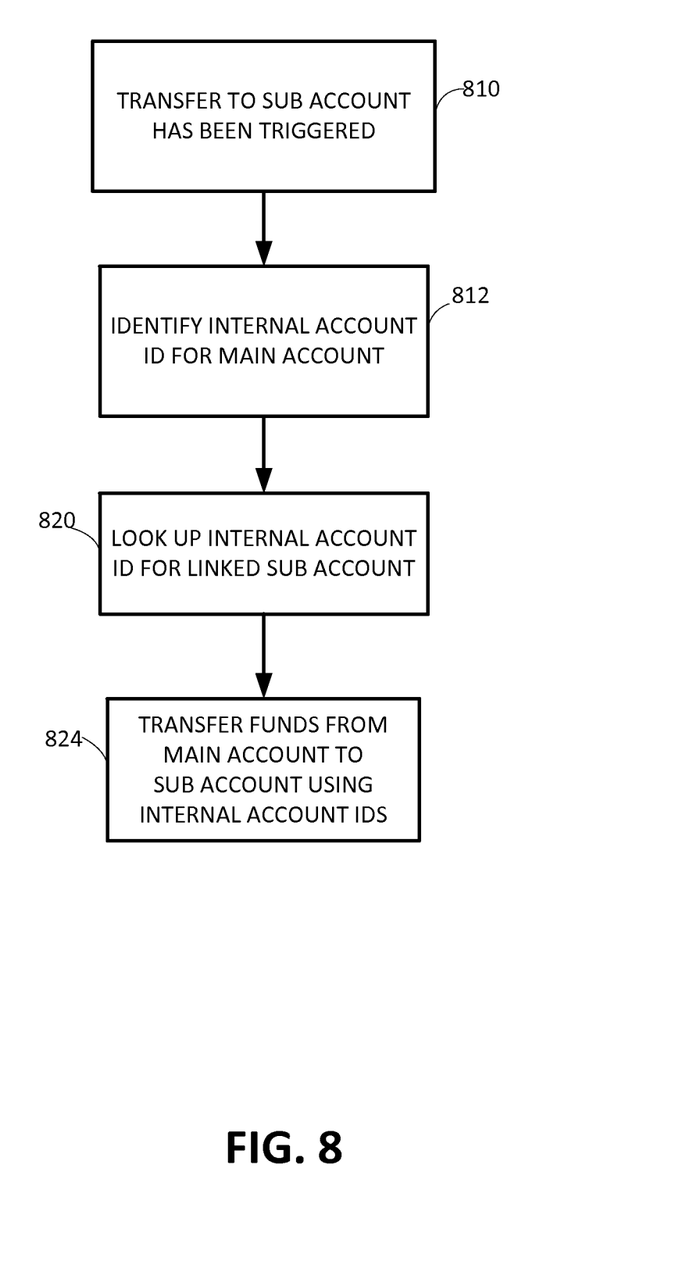
FIG. 8 is a simplified flow diagram illustrating a process at the transaction processing system seen in FIG. 1, for transferring funds from a main account to a sub account using internal account IDs.

The foregoing is generally illustrated by the process in FIG. 8, generally implemented at the transaction processing system 120. In such process, the funds in a sub account are only accessed when an internal account ID is retrieved by the transaction processing system 120. Such retrieval occurs when a transfer of funds is made from the main account to a sub account by the transaction processing system, and in other instances when the transaction processing system accesses funds in a sub account, but not when an account holder/user accesses the main account (unless the transaction processing system has been specifically programmed to access to the sub account for specific purposes—such as the use of a sub account to manage a shortage of funds in the main account, as mentioned earlier and to be described further below). Further, the internal ID of the sub account is linked to the internal account ID of the main account, rather than the account number or PAN of the main account that is used when conducting a transaction against the main account.

As seen in FIG. 8, when a user has conducted a transaction against the main account that has triggered a transfer of funds to a sub account (step 810), the sub account (which, up to that point, as not been accessed as part of the triggering transaction) has its internal account ID identified by the transaction processing system 120. Such identification may occur by the transaction processing system looking up the internal account ID for the main account in the main account managing data 214 (see also Table I, above), and then using that internal account ID for the main account to identify the internal account ID for one or more linked sub accounts step 816. Once the internal ID from the sub account (to which funds are being transferred) has been identified, then the transaction processing system transfers money from the main account using the internal account ID of the main account (the source of the funds) and internal account ID of the sub account (where the funds are being transferred), step 820.

It should be noted that the transaction processing system 120 performs other functions relating to managing funds between a main account and its linked sub accounts. For example, when a fee or transaction at the main account may lead to a shortage of funds in the main account, the system 120 may move funds from a sub account back to the main account to maintain a needed balance. The sub accounts may be given a priority to define the order in which sub accounts are to be used for such purpose, with the priority established by the Sub Account Priority Order data for each sub account see in Table I above (e.g., a sub account having a priority order "1" might be the first sub account from which funds are transferred back to the main account, a sub account having a priority "2" would be the next account from which funds are transferred if there are insufficient funds in the first sub account, and so forth). Alternatively, in some embodiments, the sub account chosen for transferring funds back to the main account can be on a first-in-first-out basis (the sub account having the oldest funds) or some other user specified basis.

As referenced in Table I above, Notification Data can establish at system 120 the types of notifications (and to whom they are sent) in the event of certain transactions. Such data can establish the manner of the notification at step 326, when an automatic transfer of funds occurred, as well as a notification of funds being transferred back to the main account to satisfy a balance needed for a transaction at the main account. Other notifications can also be established, such as notifying an account holder if a sub account balance is less than a pre-established minimum amount, when an account or sub account balance exceeds a pre-established maximum amount, and when an amount has been manually transferred (e.g., by user request) from a sub account to the main account or vice versa.

Another function performed by the transaction processing system 120 is providing access to a sub account when requested by a user. As mentioned earlier, in some cases access may be permitted by the transaction processing system when there is a shortage of funds in the main account. A user may also desire to receive funds from the sub account when the funds are to be used for the purpose for which the sub account was set up. For example, upon request by the user (e.g., at a mobile device 110), the funds in the sub account may be transferred to the main account or as a credit to a credit card account (e.g., a credit card that is being used or has been used for a vacation for which the sub account was set up). In these instances, access to the subaccount is provided by the transaction processing system through use of the previously mentioned internal account IDs.

Figure 9:
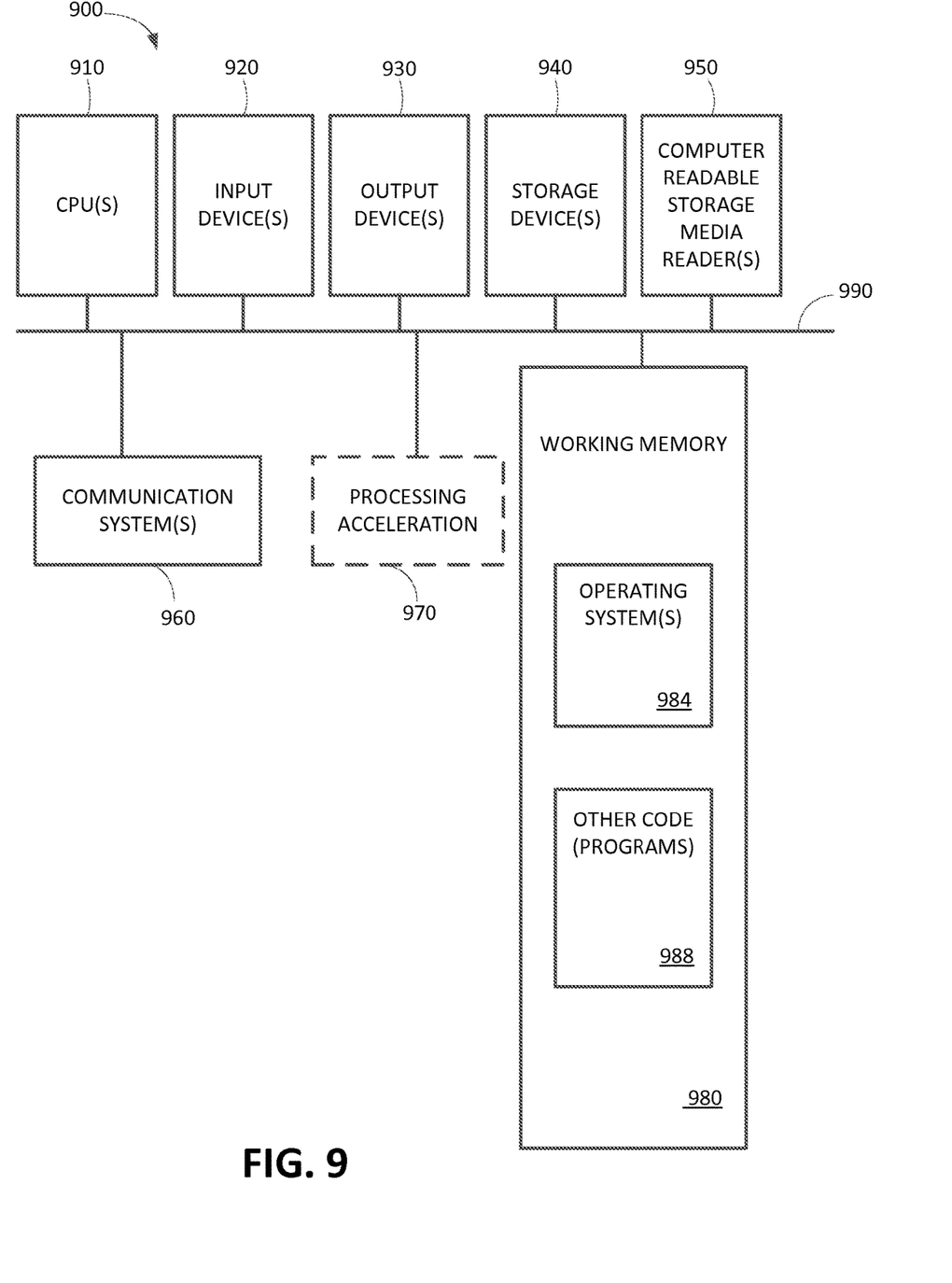
FIG. 9 is a block diagram illustrating an exemplary computer system upon which embodiments of the present invention may be implemented.

FIG. 9 is a block diagram illustrating an exemplary computer system upon which embodiments of the present invention may be implemented. This example illustrates a computer system 900 such as may be used, in whole, in part, or with various modifications, to provide the functions of the transaction processing system 120, as well as other components and functions of the invention described herein.

The computer system 900 is shown comprising hardware elements that may be electrically coupled via a bus 990. The hardware elements may include one or more central processing units 910, one or more input devices 920 (e.g., a mouse, a keyboard, etc.), and one or more output devices 930 (e.g., a display device, a printer, etc.). The computer system 900 may also include one or more storage devices 940, representing remote, local, fixed, and/or removable storage devices and storage media for temporarily and/or more permanently containing computer-readable information, and one or more storage media reader(s) 950 for accessing the storage device(s) 940. By way of example, storage device(s) 940 may be disk drives, optical storage devices, solid-state storage devices such as a random access memory ("RAM") and/or a read-only memory ("ROM"), which can be programmable, flash-updateable or the like.

The computer system 900 may additionally include a communications system 960 (e.g., a modem, a network card—wireless or wired, an infra-red communication device, a Bluetooth™ device, a near field communications (NFC) device, a cellular communication device, etc.). The communications system 960 may permit data to be exchanged with a network, system, computer, mobile device and/or other component as described earlier. The system 900 also includes working memory 980, which may include RAM and ROM devices as described above. In some embodiments, the computer system 900 may also include a processing acceleration unit 970, which can include a digital signal processor, a special-purpose processor and/or the like.

The computer system 900 may also comprise software elements, shown as being located within a working memory 980, including an operating system 984 and/or other code 988. Software code 988 may be used for implementing functions of various elements of the architecture as described herein. For example, software stored on and/or executed by a computer system, such as system 900, can be used in implementing the processes seen in FIGS. 3, 5, 7 and 8.

It should be appreciated that alternative embodiments of a computer system 900 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the transaction processing system 120 may be implemented by a single system having one or more storage device and processing elements. As another example, the transaction processing system 120 may be implemented by plural systems, with their respective functions distributed across different systems either in one location or across a plurality of linked locations.

Moreover, while the various flows and processes described herein (e.g., those illustrated in FIGS. 3, 5, 7 and 8) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of this description and the following claims.

The invention claimed is:

1. A method for managing transactions conducted at a mobile device, comprising:

storing, at a memory device in a transaction processing system, multiple data structures associated with a mobile device user, the data structures including a first data structure representing a main account of the mobile device user and a second data structure representing a sub account of the mobile device user, the first data structure including at least: (1) a first internal account ID identifying the main account, (2) a separate primary account number (PAN) identifying the main account that is provided to the mobile device user for accessing the main account, (3) a second internal account ID identifying the sub account, and (4) main account ledger data, the second data structure including at least: (1) the second internal account ID identifying the sub account, and (2) sub account ledger data, the sub account accessed by the second internal account ID and not known to the mobile device user, with the sub account thereby not being accessible to the mobile device user when accessing the main account, the first internal account ID and the second internal account ID linking the main account and the sub account in performing a funds transfer transaction between the main account and the sub account;

managing, by a processor in the transaction processing system, a funds transfer transaction from the main account to the sub account in response to a specified triggering transaction established by the mobile device user, wherein transactions posted to the main account each have an associated transaction type code, and wherein managing a funds transfer includes:

evaluating a transaction message received at the transaction processing system for each transaction posted to the main account, to identify a predetermined transaction type code associated with the specified triggering transaction established by the mobile device user; and upon receiving a transaction at the main account having the predetermined transaction type code associated with the specified triggering transaction, immediately performing an automatic funds transfer from the main account to the sub account, rather than at the end of a day, using the first and second data structures.

2. The method of claim 1, wherein the main account comprises a debit card account.

3. The method of claim 1, wherein the main account comprises a stored value account.

4. The method of claim 1, wherein the specified triggering transaction comprises a deposit transaction.

5. The method of claim 4, wherein the deposit transaction comprises a payroll deposit transaction.

6. The method of claim 5, where an ACH message is sent to the transaction processing system for purposes of conducting the payroll deposit transaction, and wherein the specified triggering transaction is determined from review of the ACH message for the predetermined transaction type code.

7. The method of claim 1, wherein the specified triggering transaction comprises a debit transaction.

8. The method of claim 7, wherein a debit transaction authorization message is sent to the transaction processing system for purposes of conducting the debit transaction, and wherein the specified triggering transaction is determined from review of the debit transaction authorization message.

9. The method of claim 8, wherein the specified triggering transaction is further determined based at least in part on a merchant ID in the debit transaction authorization message.

10. The method of claim 9, wherein the specified triggering transaction is further based on a predetermined amount of the specified triggering transaction, wherein the predetermined amount is one of a specified monetary amount, a minimum monetary amount, a maximum monetary amount, or a range of monetary amounts.

11. The method of claim 1, further comprising:

receiving, from the mobile device associated with the user, a request to automatically transfer funds from the main account to the sub account, after the specified triggering transaction has been posted to the main account; and determining, from the request, the predetermined transaction type code associated with the specified triggering transaction.

12. The method of claim 11, wherein the request to automatically transfer funds from the main account to the sub account includes the specified transaction type code.

13. The method of claim 1, further comprising sending notification to the user that the automatic funds transfer from the main account to the sub account has occurred.

14. A transaction processing system for managing transactions conducted at a mobile device, comprising:

a processor; and a memory, the memory storing instructions that are executable by the processor to:

store, at a memory device in a transaction processing system, multiple data structures associated with a mobile device user, the data structures including a first data structure representing a main account of the mobile device user and a second data structure representing a sub account of the mobile device user, the first data structure including at least: (1) a first internal account ID identifying the main account, (2) a separate primary account number (PAN) identifying the main account that is provided to the mobile device user for accessing the main account, (3) a second internal account ID identifying the sub account, and (4) main account ledger data, the second data structure including at least (1) the second internal account ID identifying the sub account, and (2) sub account ledger data, the sub account accessed by the second internal account ID, with the second internal account ID not known to the user, with the sub account thereby not being accessible to the user when accessing the main account, the first internal account ID and the second internal account ID linking the main account and the sub account in performing a funds transfer transaction;

manage a funds transfer transaction from the main account to the sub account in response to a specified triggering transaction established by the mobile device user, wherein transactions posted to the main account each have an associated transaction type code, and wherein managing a funds transfer includes:

evaluating a transaction message received at the transaction processing system for each transaction posted to the main account, to identify a predetermined transaction type code associated with the specified triggering transaction established by the mobile device user; and upon receiving a transaction at the main account having the predetermined transaction type code associated with the specified triggering transaction, immediately performing an automatic funds transfer from the main account to the sub account, rather than at the end of a day, using the first and second data structures.

15. The system of claim 14, wherein the main account comprises a debit card account.

16. The system of claim 14, wherein the main account comprises a stored value account.

17. The system of claim 14, wherein the specified triggering transaction comprises a deposit transaction.

18. The system of claim 17, wherein the deposit transaction comprises a payroll deposit transaction.

19. The system of claim 14, wherein the instructions are further executable by the processor to:

receive, from the mobile device associated with the user, a request to automatically transfer funds from the main account to the sub account, after the specified triggering transaction has been posted to the main account; and determine, from the request, the predetermined transaction type code associated with the specified triggering transaction.

20. The system of claim 19, wherein the request to automatically transfer funds from the main account to the sub account includes the specified transaction type code.

21. The system of claim 14, wherein the instructions are further executable by the processor to send notification to the user that the automatic funds transfer from the main account to the sub account has occurred.

\* \* \* \* \*